United States Patent [19]

Hirano et al.

[11] Patent Number: 5,493,639
[45] Date of Patent: Feb. 20, 1996

[54] DRAWING PROCESSING WITH FLEXIBLE ACCOMODATION OF CHARACTER STRINGS

[75] Inventors: Toshinori Hirano, Fukuoka; Osamu Yoshizaki, Hachiohji, both of Japan

[73] Assignee: Canon Kabushiki Kaisha, Tokyo, Japan

[21] Appl. No.: 493,396

[22] Filed: Mar. 14, 1990

[30] Foreign Application Priority Data

Mar. 14, 1989 [JP] Japan ........................................ 1-63255

[51] Int. Cl.[6] .................................................. G06T 11/00
[52] U.S. Cl. ............................ 395/141; 395/135; 395/149
[58] Field of Search ........................... 395/135, 145–149, 395/155–161, 144, 151, 141

[56] References Cited

U.S. PATENT DOCUMENTS 4,813,013  3/1989  Dunn ..................................... 395/156 X
4,875,187  10/1989  Smith ....................................... 395/141
4,891,770  1/1990  Hollett ................................... 395/144 X
5,021,974  6/1991  Pisculli et al. ........................... 395/151

FOREIGN PATENT DOCUMENTS 62-267858  11/1987  Japan .

Primary Examiner—Almis R. Jankus
Attorney, Agent, or Firm—Fitzpatrick, Cella, Harper & Scinto

[57] ABSTRACT

A drawing processing apparatus holds blocks and character strings as drawing objects and introduces three concepts, that is, a writable region for characters, a writable region for additional characters and a character frame within a block. The apparatus has the functions of automatic line feed within a character frame, layout of a character frame in a writable region for additional characters, addition of a character string at an arbitrary position and size adjustment between a character frame and a block.

31 Claims, 7 Drawing Sheets

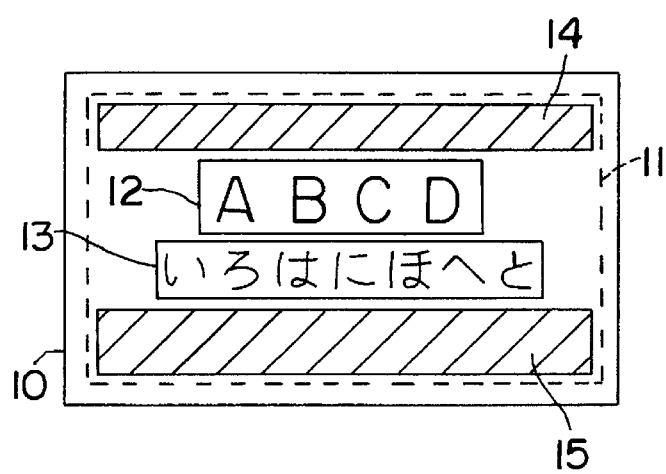
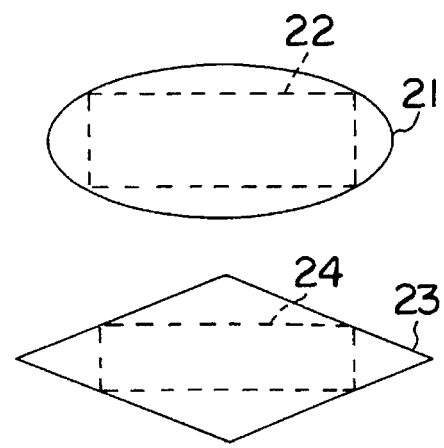
FIG.1   FIG.2
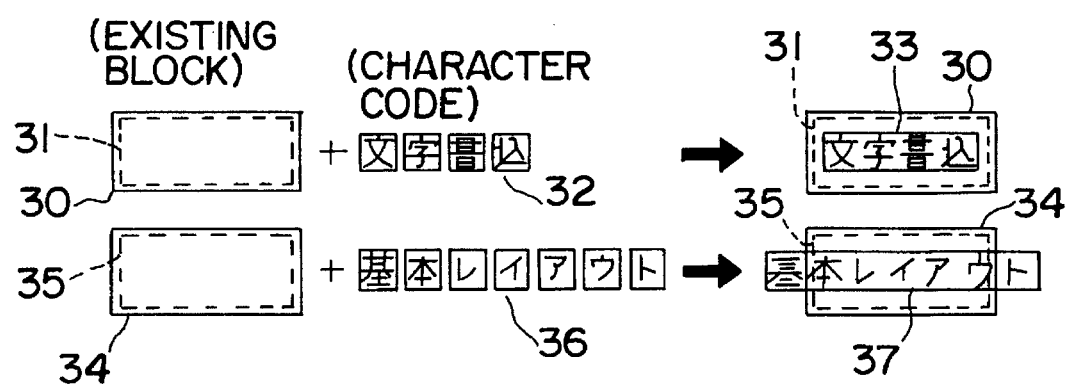
FIG.3

VERTICAL DIRECTION

HORIZONTAL DIRECTION

| OBJECT ID | OBJECT TYPE | POSITION | SIZE | INHERENT ATTRIBUTE |
|---|---|---|---|---|
| 1 | RECTANGLE | 400,300 | 80,40 | LINE WIDTH:4, KIND OF LINE : 1 |
| 2 | RECTANGLE | 400,380 | 80,40 | LINE WIDTH:4, KIND OF LINE : 1 |
| 3 | STRAIGHT LINE | 400,340 | 0,40 | LINE WIDTH:2, KIND OF LINE : 1 |
| 4 | CHARACTER STRING | 400,300 | 50,30 | CHARACTER CODE : "START !"<br>STYLE OF TYPE :1, CHARACTER SIZE :16<br>. . . |
| 5 | CHARACTER STRING | 400,500 | 40,30 | CHARACTER CODE : "PROCESSING"<br>STYLE OF TYPE :1, CHARACTER SIZE :16<br>. . . |
| . | | | | |
| N | | | | |

| INCLUSIVE RELATION ID | INCLUSIVE OBJECT | INCLUDED OBJECT |
|---|---|---|
| 1 | 1 | 4 |
| 2 | 2 | 5 |
| . | . | . |
| N | | |

FIG. 10(b)

DRAWING PROCESSING WITH FLEXIBLE ACCOMODATION OF CHARACTER STRINGS

BACKGROUND OF THE INVENTION

1. Field of the Invention

This invention relates to a drawing processing apparatus used in the fields of OA (office automation) and CAD (computer-aided design), and to a drawing processing technique for writing a character string or character strings within a block having the shape of a rectangle, an ellipsoid, a lozenge or the like when preparing a block diagram, a flowchart or the like.

2. Description of the Related Art

As the method for writing a character string or character strings within a symbol or a block in a flowchart or a block diagram, several methods have been considered in the DTP system and the drawing system.

(1) In one method, as shown in FIG. 11, the user initially assigns the number of characters in one line using a character input column 200 so that the width of a character string does not exceed the width of a block 201.

If the number of characters exceeds the block width, protrusion in the direction of the block width is prevented by performing automatic line feed and preparing a character string having a constant width. However, the user must perform the positioning of the character string and the block using an editing command.

Furthermore, if the character string has protruded in the direction of the block height, it is necessary to take appropriate measures, such as changing the size of the block.

(2) Another method may also be considered in which, as shown in FIG. 12, when preparing a character string within a block made of, for example, a rectangle, an ellipsoid or the like, a character frame (box) 211 having the same size as the circumscribed rectangle of an object block 210 is automatically prepared at the position of the rectangle, and a processing named "box setting" is performed within the box.

The main function of box setting is a layout function, such as automatic line feed of the character string at the right end of the box, centering, shift to the right or left and justification of each line, centering in the vertical direction, and shift to the upper or lower position, relative to the box.

The processing of box setting is also performed at the moment of the editing operation of the character string and the change of the box size.

Furthermore, by maintaining the relation between the block and the character string, both the box and the character string can conjointly move at the moment of executing an editing command, such as movement, deletion, rotation or the like.

(3) A similar method has also been disclosed in Japanese Patent Public Disclosure (Kokai) No. 62-267858 (1987) (Applicant: NBC Corporation). As shown in FIG. 13, this method only deals with a rectangular block, and the block itself corresponds to the box in the above-described processing. Accordingly, if the block width has been changed, the position for automatic line feed is renewed so that the character string spreads over the entire block width.

In the above-described case (1), although the width of the character frame (the number of characters) may be arbitrarily set, the relation between the character string and the block is not administrated by the system side. Hence, the user must perform the positioning of the character string and the block, and a processing to dissolve protrusion in the direction of the block height.

In the above-described case (2), the box corresponding to the character frame is automatically set only when the character string is written in a blank block, and only the mutual position relationship is thereafter maintained. Hence, the user must change the size of the box 211 when the block size has been changed to the size (210').

On the other hand, if the character string has protruded from the block when the user changed the box size to a desired size, it is necessary to change the block size in accordance with the amount of protrusion.

Furthermore, the mutual position of the character string relative to the block is maintained only for one character string. Hence, when a plurality of character strings are dealt with within the block, the above-described function to maintain the position relation is not used, and the setting of the box size and positioning are performed for each character string.

Also in the above-described case (3) of Japanese Patent Public Disclosure (Kokai) No. 62-267858 (1987), since the number of character strings which can be dealt with within the block is limited to one, it is impossible to deal with a plurality of character strings having different character sizes and spaces within the block.

Furthermore, since the character string is expanded over the entire block width (221), it is impossible to perform automatic line feed in a line width desired by the user (222).

As described above, although there have been devised various methods for writing a character string or character strings within a block, there has not been realized yet a function to dissolve protrusion or to perform layout processsing for a plurality of character strings within a block. Hence, there is enough room for improvement.

SUMMARY OF THE INVENTION

It is an object of the present invention to provide a system which deals with a plurality of character string regions within a block, and enables the layout of a character string within a block, arbitrary setting of the width of the character string and automatic line feed at the right end, adaptation of the block size to the size of the character string (size adjustment), and addition of the character string at an arbitrary position within the block, as the processing for dissolving protrusion from the block and layout at the moment of writing and editing the character string.

It is another object of the present invention to provide a drawing processing apparatus which holds blocks and character strings as drawing objects, introduces three concepts, that is, a writable region for characters, a writable region for additional characters and a character frame as the circumscribed rectangle for a character string, within a block, and has functions of automatic line feed within a character frame, the layout of a character frame in a writable region for additional characters, addition of a character string at an arbitrary position and size adjustment between a character frame and a block.

BRIEF DESCRIPTION OF THE DRAWINGS

FIG. 1 is a diagram for explaining various concepts set between character strings and a block as the basis of the present invention, in which there are shown a block 10, a writable region for characters 11, a first character string 12, a second character string 13, a first writable region 14 for additional characters, and a second writable region 15 for additional characters;

FIG. 2 illustrates writable regions for characters in blocks having shapes other than a rectangle;

FIG. 3 is a diagram for explaining a basic layout function as a basic function of the present invention;

DETAILED DESCRIPTION OF THE PREFERRED EMBODIMENT

The preferred embodiment of the present invention will now be explained in detail with reference to the drawings.

Figure 8:
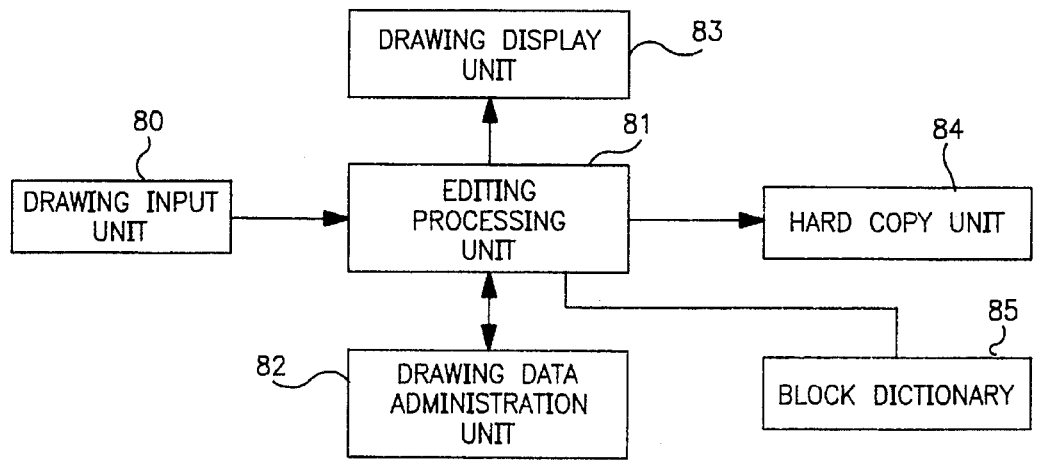
FIG. 8 is a diagram for explaining an example of the configuration of a drawing preparation system according to the present invention.

FIG. 8 shows the configuration of a drawing preparation and editing apparatus according to the present invention.

In FIG. 8, a drawing input unit 80 comprises a drawing reading unit for reading a drawing through a scanner including a CCD or the like to convert the scanned image into drawing data, or a unit for receiving an existing drawing file from other drawing system to convert it into a drawing data format in the present system. It may of course comprise a unit for accessing a template drawing by a keyboard, a pointing device or the like (not illustrated), or for receiving a drawing obtained by free drawing or by setting diagonal points in a rectangular region or the like.

Figure 9:
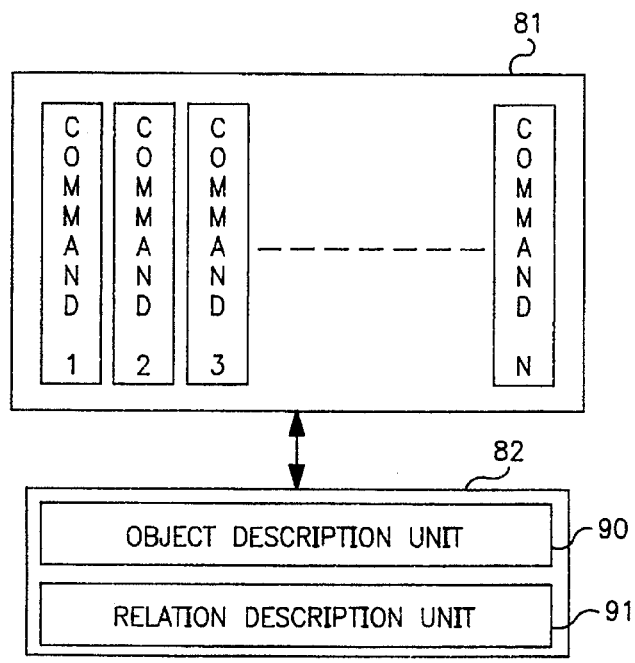
FIG. 9 is a diagram for explaining an editing processing unit and a drawing data administration unit in the example of the configuration of the drawing preparation system according to the present invention.

An editing processing unit 81 prepares and edits a new drawing, or edits an existing drawing input from the drawing input unit 80. As shown in FIG. 9, various commands for the preparation/editing operation of a drawing are provided in the editing processing unit 81. Included therein is a command for preparing/editing a character string as the realized aspect of the present invention.

As other editing commands, there are commands for the formation, deletion, movement, change in size, reproduction and the like of a drawing.

A block dictionary 85 stores data for coordinate points in standard sizes representing the shapes of various kinds of blocks (drawings having closed regions), that is, a rectangle, a lozenge and the like, together with identification data.

A drawing administration unit 82 holds and administrates drawings in a plan which are targets of editing operations as drawing objects. It may be considered that drawings necessary in a plan are extracted from the abovedescribed block dictionary 85.

As shown in FIG. 9, the drawing data administration unit 82 is roughly divided into an object data description unit 90 end a relation description unit 91.

The object data description unit 90 describes data of respective drawings in the form as shown in FIG. 10(b).

The term "object" indicates a minimum unit for an individual drawing as a target of an editing operation. The kinds of objects include a block, a character string, a straight line and the like.

As shown in FIG. 10(b), object ID's having serial numbers are given to all drawing objects.

The term "block" indicates a drawing within which character strings can be written.

As attribute data for each object, there are the kind, position, size and the like of the object.

As object types, there are the kinds of objects, such as a rectangle, an ellipsoid, a lozenge, a parallelogram and the like.

The position of an object is represented in principle by the central position of the object. For a straight line, however, the position is represented by the coordinate of the starting point. These kinds of position information are used for the determination and processing for, for example, the inclusive relation (production relation), protrusion relation, movement and the like, which will be described later.

The size is represented by the circumscribed rectangle of an object. For a straight line, however, the size is represented by a relative position from the starting point.

In addition, as shown in FIG. 10(b), each object has attribute values which are inherent for its type.

For example, the attribute values for a rectangle are the width and kind of lines, and the attribute values for a character string are a character code, the style of a type, a character size, a space between characters and the like.

The relation description unit 91 describes the inclusive relation between objects. For example, when a character is input by moving a cursor within a block on a picture surface, inclusive relation arises. The situation is identical even when a character frame has previously been set.

The term "inclusive relation" indicates a state in which an object is arranged within a block, and is represented by a pair consisting of an ID (identification) of an inclusive object and an ID of an included object.

Figure 10A:
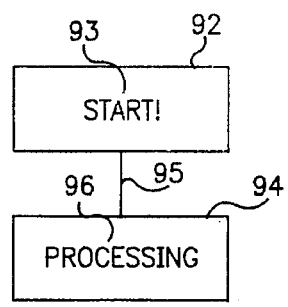
FIG. 10, composed of FIGS. 10(a) and 10(b), explains a method of holding drawing data in the example of the configuration of the drawing preparation system according to the present invention.
Figure 11:
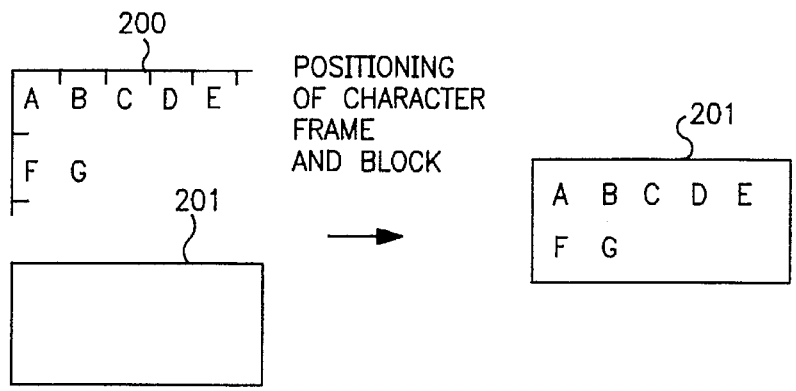
FIG. 11 is a diagram for explaining a prior art example.

FIG. 10(a) shows visualized patterns, and FIG. 10(b) shows data groups corresponding to FIG. 10(a). These data groups are of course stored in the relation description unit 91 shown in FIG. 9. The FIG. 10(b) example describes that, in inclusive relation 1, a rectangle 92 having an object ID 1 includes a character string 93 having an object ID 4.

The included object simultaneously receives the effect of an editing command for the inclusive object.

For example, when the inclusive object has moved, the included object moves in accordance with the movement of the inclusive object. If the inclusive object has been deleted, the included object is also deleted.

In the present invention, a character string within a block is dealt with using the relation that the block includes the character string.

As described above, drawings and character strings within a plan are dealt with as objects, and the inclusive relation among them is described. However, the kinds of objects and the methods for holding data are not limited to those described in this embodiment of the invention.

The minimum requirements are that each block has its position, size and kind, and there is a description about the inclusive relation between a block object and a character string object. The same kind of administration is performed even if a plurality of writable regions for additional characters are provided, and even if character strings are written within the regions.

Various concepts set between a block and character strings as the basis of the present invention will now be explained with reference to FIG. 1.

Explanation of the concepts

It is assumed that a block within which character strings are to be written is a rectangle 10. A rectangle region 11 within which character strings may be written is set within the rectangle 10. This region is named a writable region for characters. This setting is performed by the operation of a key pointing device or the like by the operator. Alternatively, a region covering, for example, 90% of the block 10 may automatically be set as the rectangle region.

Layout for character strings is performed so that character strings are received within this region.

The writable region for characters is in general the circumscribed rectangle of the drawing, and may automatically be produced. FIG. 2 shows a writable region 22 for characters for an ellipsoid 21, and a writable region 24 for characters for a lozenge 23. As is apparent from FIG. 2, respective writable regions for characters for an ellipsoid and a lozenge are not uniquely determined. The most reasonable method to determine a writable region for characters for a certain figure is to make a rectangle which is similar to the circumscribed rectangle of the figure the writable region for characters.

A region occupied by a character string is represented by setting a character frame consisting of the circumscribed rectangle of the character string for the character string, such as regions 12 and 13 shown in FIG. 1.

That is, a state in which character strings are written within a block without protruding from the block is one in which the character frames formed by the character strings included within the block are situated within the writable region 11 for characters in the block, and in which the character frames (the frames of the character strings) 12, 13 and the like do not overlap each other. This is realized by determining coordinate data.

Regions 14 and 15 left within the writable region 11 for characters after the character frames 12, 13 and the like have been arranged within the writable region 11 for characters are named writable regions for additional characters.

Accordingly, the writable region for additional characters at the moment when no character frame has been written is equal to the writable region for characters.

By introducing the writable regions 14, 15 and the like for additional characters, it is possible to realize a function to add a new character frame without changing the positions of existing character strings. Character frames which have initially been set and a character frame to be newly set, which are functionally first and second setting means, are set by a keyboard, a pointing device or the like.

That is, when adding a new character string, it is possible to set the new character string at a desired position by indicating a writable region for additional characters by a pointing device or the like.

At this time, a check is performed about whether or not the character frame has protruded from the writable region for additional characters as the target.

This check for protrusion is equivalent to investigating the inclusive relation between the two rectangles representing the character frame and the writable region for additional characters. The inclusive relation can easily be investigated by comparing the size relation between respective coordinates of two diagonal points of the two rectangles.

The situation is identical for the overlap between character frames described before.

For the purpose of simplification, the writable region for additional characters is considered only in the vertical direction.

The writable region for additional characters may also be considered in the horizontal direction in the same manner except that administration becomes complicated. For example, in FIG. 1, a writable region for additional characters may be set to the right or left portion of the character frame 12 according to the same method as in the present embodiment.

The preparation and editing function of a character string within a block using the above-described various concepts set between the character string and the block will now be described in detail.

Basic layout function

FIG. 3 shows a "basic layout function" which is the most basic function to be realized in the present invention.

Suppose that a character string "文字書込(character writing)" represented by a character code 32 is written within a block 30. This operation may be performed by indicating by a pointing device so that a key input or all input from a host apparatus enters within the block 30.

Since there is no existing character string, a writable region 31 for additional characters within the block 30 is equal to the writable region for characters.

For the character string object represented by the character code 32, a character frame 33 is prepared according to the attributes of another character string, such as the style of a type, character size, space between characters, direction of characters and the like.

The present basic layout function performs the positioning of this character frame and the writable region for additional characters as the target.

When the character string object represented by a character code 36 "基本レイアウト(basic layout)" is written within the block 34, the width (in the horizontal direction) of a character frame 37 exceeds and hence protrudes from the block width.

A case has now been shown in which only the centers of two rectangles are made to coincide with each other. However, a case may arise in which the layout of character frames is needed where a plurality of character strings are written within a block. FIGS. 6(a) through 6(f) show various styles of the layout of character frames in writable regions for additional characters as the targets.

Figure 5:
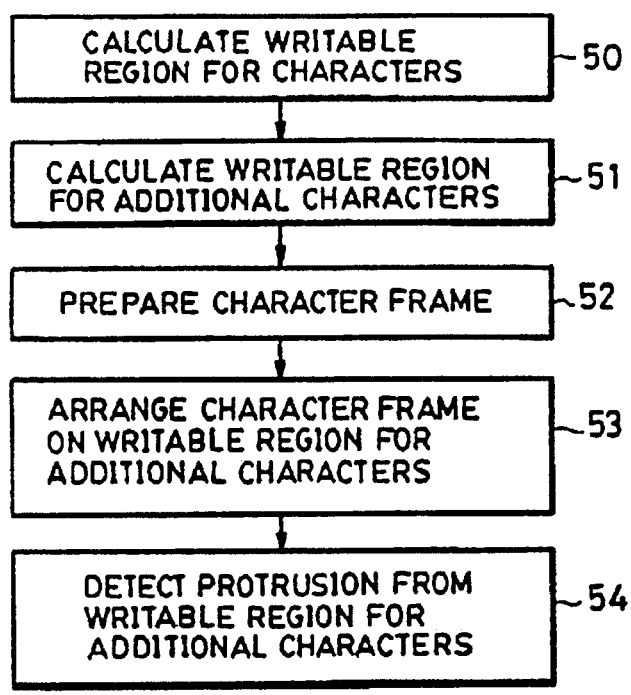
FIG. 5 is a diagram showing the processing procedure of the basic layout function.
Figure 6A:
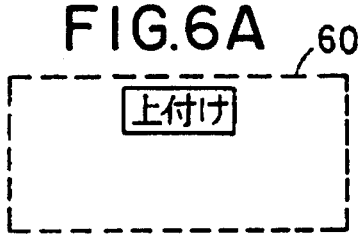
FIGS. 6(a)–6(f) is a diagram for explaining layout styles for character frames in the basic layout function.
Figure 6D:
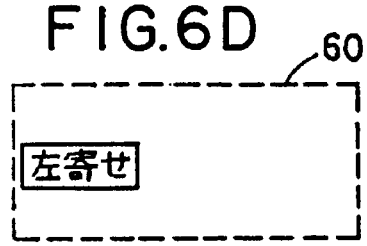
Figure 6B:
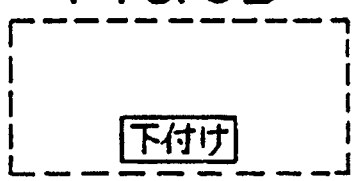
Figure 6E:
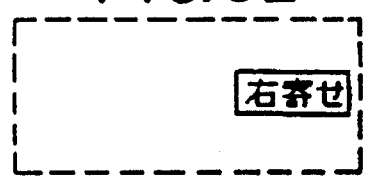
Figure 6C:
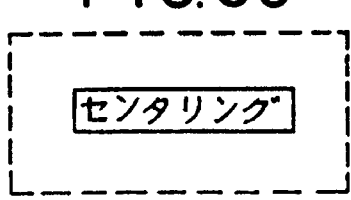
Figure 6F:
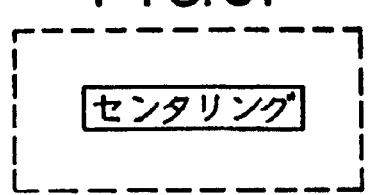

The above-described basic layout function is realized by the procedure as shown in FIG. 5.

First, the writable region for characters in the block as the target is calculated by process 50.

This operation can easily be performed if there is information relative to the kind, position and size of the block.

As for the basic information about the writable region for characters within the block, an allowable region for characters may previously have been stored for each block and may be described in the form of a dictionary similar to the block dictionary 85. That is, if the block is a rectangle, 90% of the size of the rectangle, for example, may previously have been stored as the writable region for characters. Within the dictionary, if the position and size are represented by a normalized coordinate system, the stored value may merely be converted into a real coordinate.

At process 51, writable regions for additional characters are calculated from the obtained writable region for characters.

For this purpose, the information relative to character strings included within the block is first obtained using the relation description unit 91 which administrates the inclusive relation data described before.

If there exists no character string within the block, the writable region for additional characters is equal to the writable region for characters.

If there already exist character strings, the regions as indicated by numerals 14 and 15 in FIG. 1 become the writable regions for additional characters.

It is then necessary to select one writable region for additional characters for placing a character frame. For this purpose, the information at the moment when the user has assigned the target for writing is used. When the block has been assigned, the writable region for additional characters situated at the lowest position is selected. For other cases, the writable region for additional characters which includes or which is closest to a coordinate given by a pointing device is selected.

The character frame is then prepared at process 52.

When a character string is newly prepared, the width of the character frame is not previously determined. The line having the largest width in the character string determines the width of the character frame. When a character string is newly prepared, the character frame is successively provided every time one character is input. At this processing, the character string extends over a plurality of lines when a line feed code is included within the character code.

At process 53, the character frame is arranged on the writable region for additional characters as the target. As described before, although various ways of arrangement as shown in FIGS. 6(*a*)–6(*f*) may be considered, it is considered that, in most cases, the centers of corresponding rectangles are made coincide with each other.

Finally, at process 54, a check is performed as to whether or not the character frame protrudes from the writable region for additional characters as the target. The user is notified of the result of the check (by sound, display or the like). If the character frame has protruded, the process proceeds to the selection (interactive processing) of the most suitable layout function which is to be subsequently performed.

The most suitable layout function

The most suitable layout function will now be explained with reference to FIG. 4.

This function is a processing to dissolve or prevent the protrusion of the character string from the block which has been produced at the moment of writing the character string within the block 34 Shown in FIG. 3.

The function (a), which is named a function to prepare the most suitable character frame, is a function to prevent protrusion by preparing a character frame which is suitable for the block size. When preparing a character frame 41, the size of a block 40 which includes it has not been considered.

A character frame 41' in which protrusion has been dissolved according to the present function makes the width of a given writable region for additional characters (in this case, equal to the allowable region for characters) its own width. Characters exceeding the width are subjected to automatic line feed at the right end of the character frame and are extended in plural lines. Thus, protrusion in the horizontal direction is prevented.

When characters are extended in plural lines within the character frame as described above, the user may select a method of positioning each line (a style of arranging lines within the character frame) in the horizontal direction. The character frame 41' represents a method in which each line is subjected to shift to the left, and a character frame 41" represents a method in which each line is subjected to centering.

In these examples, there is no problem because the height of the character frame does not exceed the height of the writable region for additional characters. However, protrusion in the direction of height may arise when using the present function.

The adaptation function (b) for the block region is a function of changing the size of the block in accordance with the character frame of a character string the attributes of which are to be unchanged.

The protrusion of a character frame 43 from a block 42 is dissolved in a block 42' the width of which has been changed in accordance with the character frame 43 according to this function.

Strictly speaking, the change in the block width indicates a change in the width of the writable region for characters (the writable region for additional characters) in the block so as to coincide with the character frame.

Similarly, the adaptation function for the block region is also provided for the direction of height. Plural character frames may sometimes be targets of this function for the direction of height. In such a case, these character frames are arranged so as to be received within the writable region for characters in the block while maintaining a proper space between the character frames.

The function (c) is a function for writing a character string within a block in good balance by changing the attributes of the character string, such as the character size, space between characters and the like.

Figure 4A:
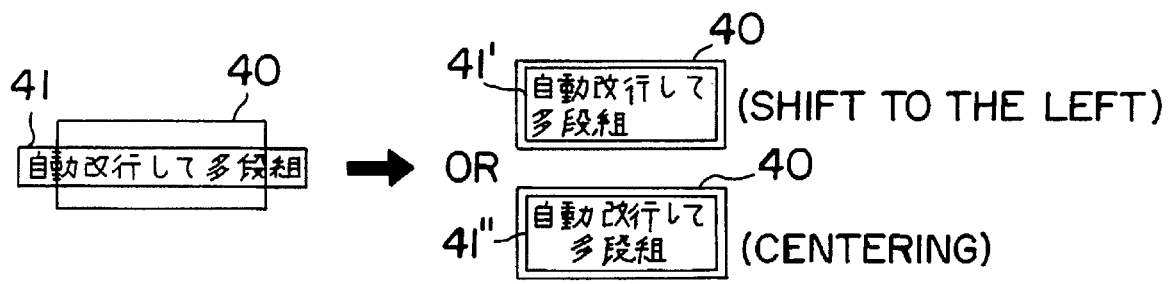
FIGS. 4(a)–4(c) are diagrams for explaining the most suitable layout function as a basic function of the present invention.

In FIG. 4(*c*), a character frame 45 is received within a block 44 without producing protrusion. However, it may sometimes be desired to expand the space between characters in order to fully display characters within the block for the purpose of easier observation.

For that purpose, a character frame 45' is provided by expanding the space between characters within the limit so that the character frame does not protrude from the writable region for additional characters. Similarly, a character frame 45" is provided by magnifying the character size within the same limit.

The basic layout function and the most suitable layout function have now been described. These functions are the basic functions for efficiently writing a character string within a block while maintaining high quality. It is recommended to use these functions properly combining them in accordance with the need of the user in an interactive drawing preparation and editing system.

Figure 7:
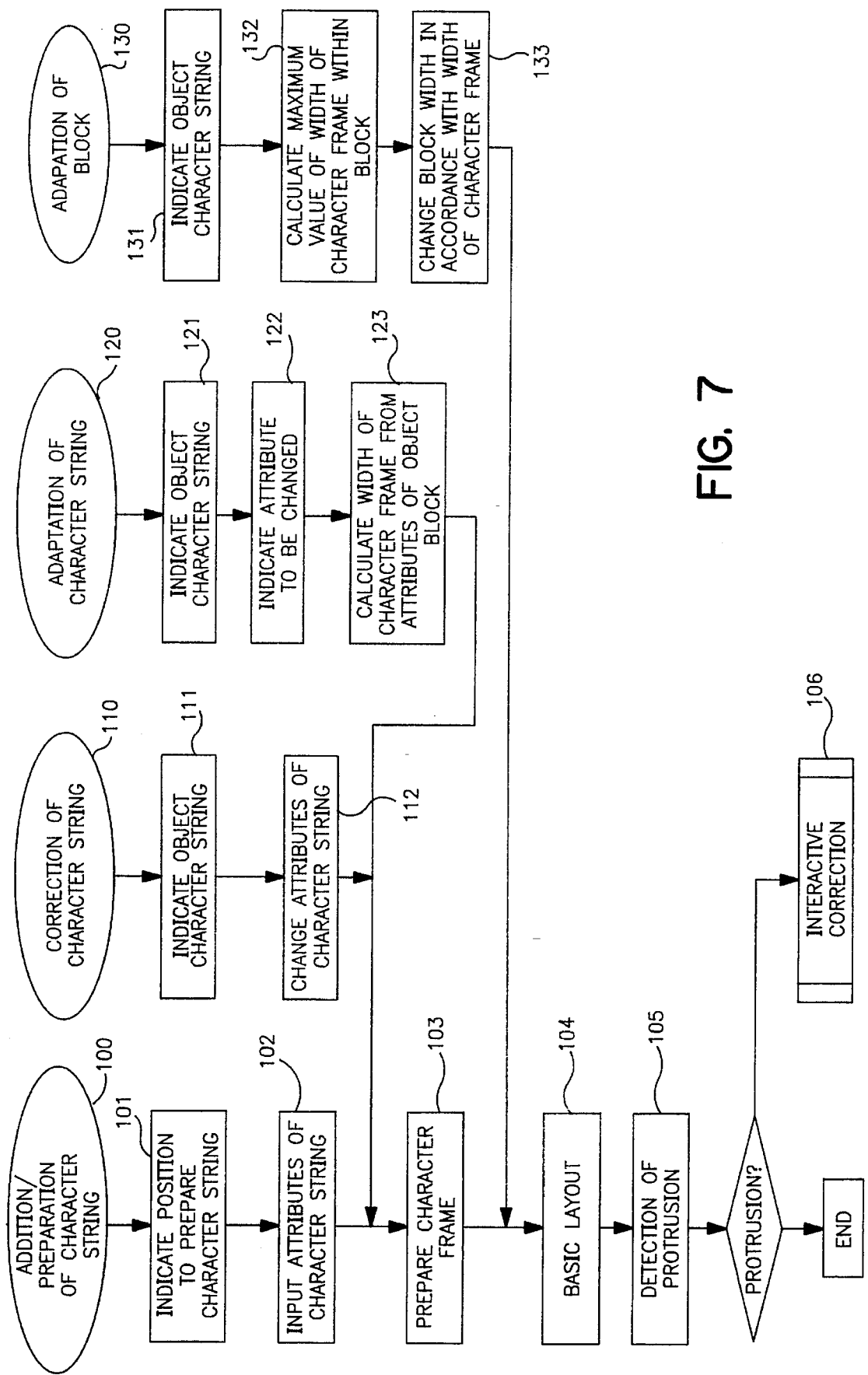
FIG. 7 is a diagram for explaining the flow in an interactive adaptation processing between a character string and a block.

FIG. 7 shows the flow of the processing in an interactive system which prepares and edits a character string within a block combining the above-described functions.

In a general drawing preparation system, this flow corresponds to one command for processing a character string.

Subcommands to be selected by the user during the execution of this command are mainly the following four items. These subcommands are represented by elliptic terminals shown in FIG. 7.

Function of preparation/addition of a character string

A function 100 of preparation/addition of a character string will now be explained.

First, a position to prepare a character string is indicated by a pointing device at process 101.

At this time, if the block itself has been indicated, it is assumed that the writable region for additional characters situated at the lowest position has been selected as the target. This information will be used in basic layout at process 103. Whether or not a region is situated at the lowest position can be determined according to coordinate data.

Subsequently, at process 102, the attributes of the character string object, such as the character code, style of a type, character size and the like, are input.

The character frame is then prepared at process 103.

Since the width of the character frame has already been determined, characters exceeding the width are subjected to automatic line feed at the right end of the character frame, and line arrangement is performed in an assigned style.

When arriving at this process from the terminal 100, the width of the character frame has been adjusted to the longest line in the character string.

Next, at process 104, the basic layout processing described before is performed, in which the character frame is arranged within the writable region for additional characters as the target in the given style.

When arriving at this process from a terminal other than the terminal 100, the character frame is once removed from the writable region for characters, and layout is performed for the writable region for additional characters which is produced.

At process 105, a check is performed for the protrusion of the character frame from the writable region for additional characters which might be produced as a result of the basic layout. The check is performed by comparing the coordinate data described before.

When protrusion has not been produced, the processing for the character string is terminated.

When protrusion has been produced, the state is displayed, and the indication of the next process is requested to the user.

The user then selects either one of processes 110 and 130 in order to dissolve the protrusion.

Correction of the attributes of the character string

Operation 110 is for the correction of the attributes of the character string. The term "attributes" in this case indicates the attributes of the character string object, such as the character code, the style of a type, the character size, the space between characters, the width of the character frame, the style of arranging lines within the character frame, the basic layout style for the character frame, and the like.

First, at process 111, the character string object as the target is indicated. Subsequently, the attributes of the indicated character string are displayed, for example, within a pop-up window. The user modifies the contents of the display as much as necessary using a pointing device, a keyboard or the like.

Figure 4B:
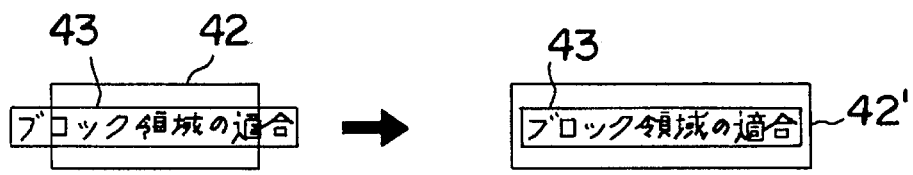
Figure 4C:
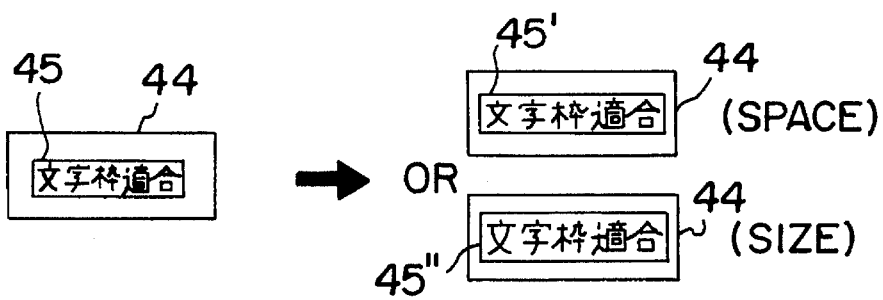

Subsequently, the process proceeds to process 103, where a series of processing as described before are performed Adaptation of the character string Operation 120 is for the adaptation of the character string to the block.

in this operation, the size of the character string is changed in accordance with the block, as shown in FIG. 4(c).

First, at process 121, the character string as the target is indicated. This process may be omitted if this process is performed succeeding the detection of protrusion.

Subsequently, at process 122, the character attribute to be modified is indicated. In this case, any one of the space between characters, the space between lines and the character size is to be indicated.

Next, at process 123, the size of the writable region for additional characters which corresponds to the character string is obtained. As described before, the writable region for additional characters has been obtained by once removing the character string from the allowable region for characters.

Adaptation of the block

Process 130 is for the adaptation of the block to character string.

In this process, the size of the block is changed in accordance with the character frame, as shown in FIG. 4(b).

First, at process 131, the block as the target is indicated This process may be omitted if the block has been selected immediately after the detection of protrusion because the block is self-evident.

Subsequently, at process 132, the circumscribed rectangle of the character frame within the block is obtained. For this purpose, the object character string ID within the block is obtained from the data 82 about the inclusive relation, and the circumscribed rectangle of the character frame is obtained from the position and size of the character string.

At process 133, the size of the block is adjusted to the size of the circumscribed rectangle of the character frame obtained at process 132. To put it concretely, the size of the allowable region for characters in the block is made coincide with the circumscribed rectangle. The elements to be adapted, which have previously been assigned by the user, are any one of only the width, only the height, and both the width and height (so-called dimensions). It is to be noted that all the operations of these processes are interactively indicated through the operation of a cursor and a pointing device for indicating the drawing and command menu displayed on the picture surface as the targets of editing operation.

As described above, according to the present invention, it becomes possible to effectively prepare a character string or character strings within a block, and to perform adaptation processing for the correct position and size in accordance with the taste of the user in the layout operation within the block. Furthermore, particularly since such layout processing can be performed for a plurality of character strings within a block, the present invention can deal with a wide variety of drawings.

What is claimed is:

1. A drawing processing apparatus comprising:

first setting means for setting a character acceptable region for characters where characters can be written within a block;

second setting means for setting a character frame region for characters; and third setting means for setting a writing region for additional characters within a remaining unwritten portion after arrangement of the character frame region set within said character acceptable region by said second setting means.

2. A drawing processing apparatus according to claim 1, wherein the size of said character frame region is set in accordance with the size of circumscribed rectangle of a character string constituting said frame.

3. A drawing processing apparatus according to claim 1, wherein said block is an ellipsoid or a lozenge.

4. A drawing processing apparatus according to claim 1, further comprising storage means for storing information related to respective attributes of the block and the characters and discriminating means for discriminating a positional relation between the character acceptable region and said character frame region when said character frame region is arranged in accordance with their respective attributive information stored in said storing means.

5. A drawing processing apparatus according to claim 4, wherein said block is expanded to include said character frame region when said character frame region is out of said character acceptable region as a result of a discrimination by said discriminating means.

6. A drawing processing apparatus according to claim 1, further comprising control means for controlling the size of said character frame region to be fit for the size of said character acceptable region.

7. A drawing processing apparatus according to claim 1, further comprising a display means for displaying said block and said characters.

8. A drawing processing method comprising the steps of:

setting a character acceptable region for characters where characters can be written within a block;

setting a character frame region for characters; and setting a writing region for additional characters within a remaining unwritten portion after arrangement of the character frame region set within the character acceptable region.

9. A drawing processing method according to claim 8, wherein the size of said character frame region is set in accordance with the size of a circumscribed rectangle of a character string constituting said frame.

10. A drawing processing method according to claim 8, wherein said block is an ellipsoid or a lozenge.

11. A drawing processing method according to claim 8, further comprising the steps of storing information related to respective attributes of the block and the characters and discriminating a positional relation between the character acceptable region and said character frame region when said character frame region is arranged in accordance with their respective attributive information stored in said storing step.

12. A drawing processing method according to claim 11, further comprising the step of expanding said block to include said character frame region when said character frame region is out of said character acceptable region as the result of said discrimination step.

13. A drawing processing method according to claim 11, further comprising the step of controlling said character frame to be within said writing region for additional characters when said frame is out of said region as the result of said discrimination.

14. A drawing processing method according to claim 8, further comprising the step of controlling the size of said character frame region to be fit for the size of said character acceptable region.

15. A drawing processing method according to claim 8, further comprising a step of displaying said block and said characters on a display means.

16. A drawing processing apparatus comprising:

specifying means for specifying an acceptable region for characters in a block;

setting means for setting a character frame region for characters within said character acceptable region;

storage means for storing information related to respective attributes of the block and the characters;

discriminating means for discriminating a positional relation between said character acceptable region and said character frame region in accordance with their respective attributive information stored in said storage means; and informing means for informing an operator that said character frame region is discriminated to be out of said character acceptable region by said discriminating means.

17. A drawing processing apparatus according to claim 16, wherein said block is expanded to include said character frame region when said character frame region is out of said character acceptable region as a result of a discrimination by said discriminating means.

18. A drawing processing apparatus according to claim 16, wherein said character frame region is controlled to be in said character acceptable region when said character frame region is out of said block as a result of a discriminating by said discriminating means.

19. A drawing processing apparatus according to claim 16, wherein the attributive information includes size, position, kind of lines, width of lines, character codes, style of type, character size and such.

20. A drawing processing apparatus according to claim 16, further comprising control means for controlling the size of said character frame region to be fit for the size of said character acceptable region.

21. A drawing processing apparatus according to claim 16, further comprising a display means for displaying said block and said characters.

22. A drawing processing apparatus according to claim 16, wherein said character acceptable region is a writing region for additional characters.

23. A drawing processing apparatus according to claim 16, wherein said informing operation is performed by sounds or a display.

24. A drawing processing method comprising the steps of:

specifying an acceptable region for characters in a block;

setting a character frame region for characters within said character acceptable region;

storing information related to respective attributes of the block and the characters;

discriminating a positional relation between said character acceptable region and said character frame region in accordance with their respective attributive information stored in said storing step; and informing an operator that said character frame region is discriminated to be out of said character acceptable region in said discriminating step.

25. A drawing processing method according to claim 24, further comprising the step of expanding said block to include said character frame region when said character frame region is out of said character acceptable region as a result of said discriminating step.

26. A drawing processing method according to claim 24, further comprising the step of controlling said character frame region to be in said character acceptable region when said character frame region is out of said block as a result of said discriminating step.

27. A drawing processing method according to claim 24, wherein the attributive information includes size, position, kind of lines, width of lines, character codes, style of type, character size and such.

28. A drawing processing method according to claim 24, further comprising the step of controlling the size of said character frame region to be fit for the size of said character acceptable region.

29. A drawing processing method according to claim 24, further comprising a step of displaying said block and said characters on a display means.

30. A drawing processing method according to claim 24, wherein said character acceptable region is a writing region for additional characters.

31. A drawing processing method according to claim 24, wherein said informing operation is performed by sounds or a display.

* * * * *

UNITED STATES PATENT AND TRADEMARK OFFICE
CERTIFICATE OF CORRECTION

PATENT NO. : 5,493,639

DATED : February 20, 1996

INVENTORS : TOSHINORI HIRANO ET AL.    Page 1 of 3

It is certified that error appears in the above-identified patent and that said Letters Patent is hereby corrected as shown below:

ON TITLE PAGE, item [54],

Col. 1, line 2, "ACCOMODATION" should read --ACCOMMODATION--.

Title page,

AT [57] ABSTRACT  "characters" line 5, should read --characters,--.

COLUMN 1

Line 2,    "ACCOMODATION" should read --ACCOMMODATION--;
Line 57,   "NBC" should read --NEC--.

COLUMN 3

Figure 12:
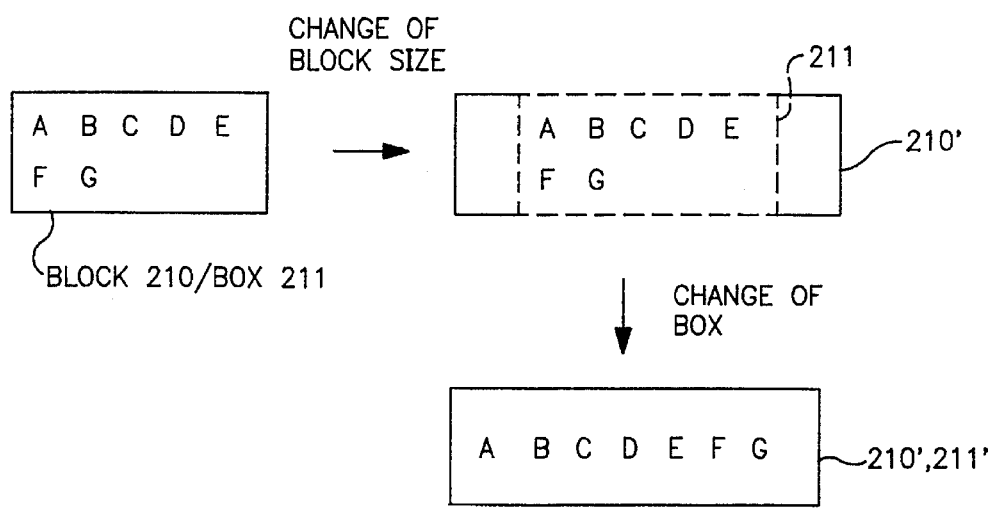
FIG. 12 is a diagram for explaining another prior art example.
Figure 13:
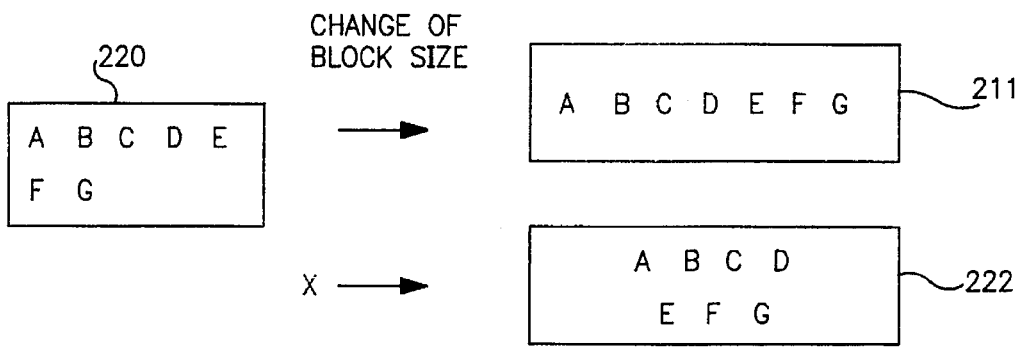
FIG. 13 is a diagram for explaining still another prior art example.

Line 14,   "is a diagram" should read --are diagrams--;
Line 25,   "invention; FIG. 10," should read --invention; ¶ FIG. 10,--;
Line 28,   "invention; FIG." should read --invention; ¶ FIG.--;
Line 29,   "example; FIG. 12" should read --example; ¶ FIG. 12--;
Line 31,   "FIG. 13" should read --¶ FIG. 13--.

UNITED STATES PATENT AND TRADEMARK OFFICE
CERTIFICATE OF CORRECTION

PATENT NO. : 5,493,639

DATED : February 20, 1996

INVENTORS : TOSHINORI HIRANO ET AL.

It is certified that error appears in the above-identified patent and that said Letters Patent is hereby corrected as shown below:

COLUMN 4

Line 2, "abovedescribed" should read --above-described--;
Line 6, "end" should read --and--.

COLUMN 7

Line 52, "Shown" should read --shown--.

COLUMN 9

Line 56, "in" should read --In--.

COLUMN 10

Line 9, "indicated" should read --indicated.--.
Line 56, "circumscribed" should read --a circumscribed--.

UNITED STATES PATENT AND TRADEMARK OFFICE
CERTIFICATE OF CORRECTION

PATENT NO. : 5,493,639

DATED : February 20, 1996

INVENTORS : TOSHINORI HIRANO ET AL.  Page 3 of 3

It is certified that error appears in the above-identified patent and that said Letters Patent is hereby corrected as shown below:

COLUMN 12

Line 8, "nating" should read --nation--.

Signed and Sealed this

Twenty-sixth Day of November 1996

Attest:

BRUCE LEHMAN

Attesting Officer                    Commissioner of Patents and Trademarks